March 10, 1964   G. A. HELLAND ETAL   3,124,227
AUTOMATICALLY RESETTING TORQUE CLUTCH
Filed Oct. 17, 1960
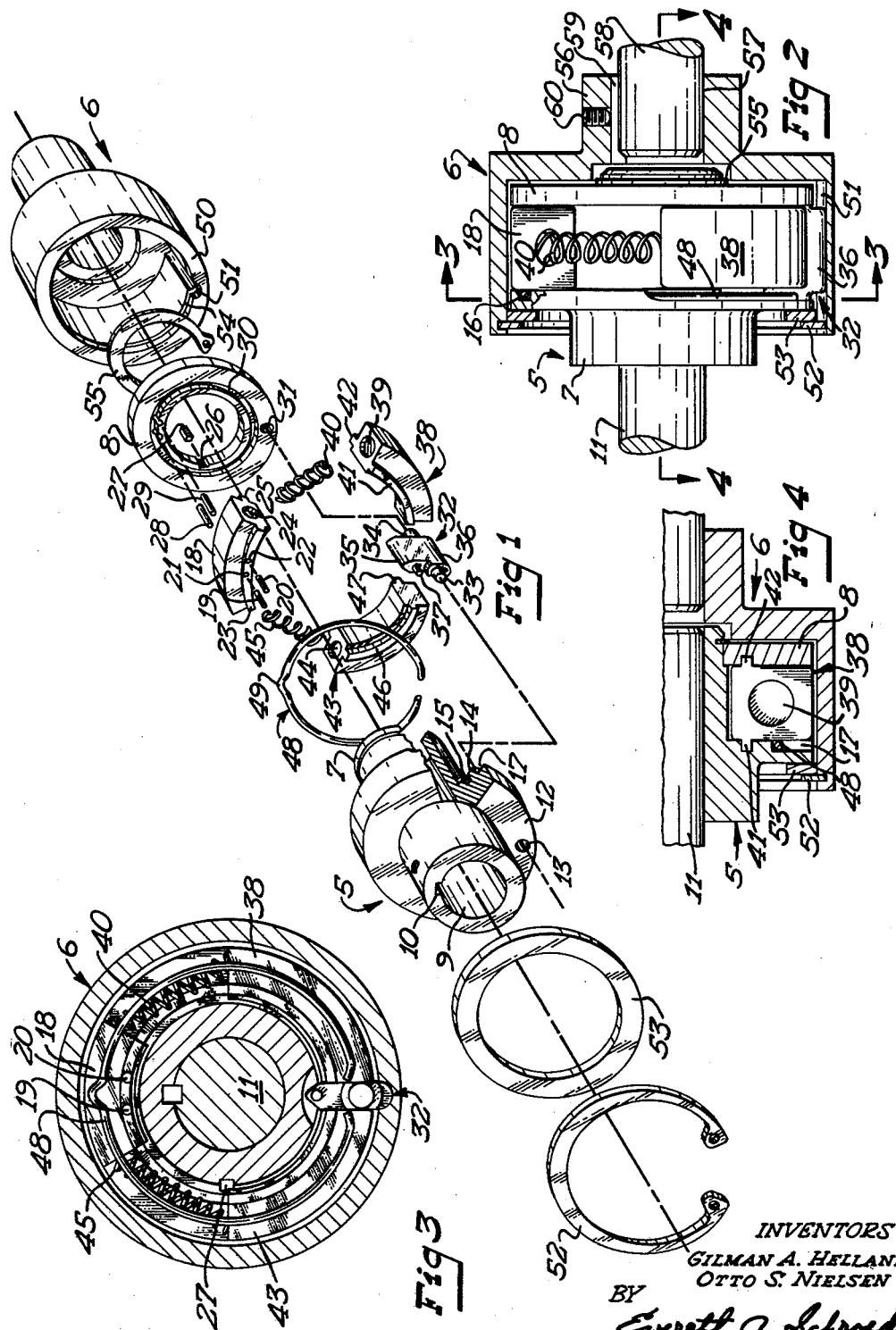
INVENTORS
GILMAN A. HELLAND,
OTTO S. NIELSEN
BY
ATTORNEY United States Patent Office 3,124,227
Patented Mar. 10, 1964

3,124,227
AUTOMATICALLY RESETTING TORQUE CLUTCH
Gilman A. Helland, Wayzata, Minn., and Otto S. Nielsen, 4875 Sorrell Ave. N., Minneapolis, Minn.; said Helland assignor to Helland, Inc., Wayzata, Minn., a corporation of Minnesota
Filed Oct. 17, 1960, Ser. No. 63,099
14 Claims. (Cl. 192—56)

This invention relates to torque clutches. More particularly, it relates to torque clutches of the type which will automatically reset themselves upon the withdrawal of the excessive torque applied to the driven member.

Various types of resetting torque clutches have been devised over the years but none of them have been completely satisfactory. The most frequent disadvantage of such clutches has been the excessive friction involved when the clutch has been compelled to release the driven member and the driving member continues to rotate, with the result that the entire unit becomes heated excessively and locks. When this takes place the electric motor which is generally utilized by the driven member will frequently burn out. Another serious disadvantage, particularly in the type of clutches wherein a ball detent is utilized is that when the device is permitted to run after having disengaged the driven member, the edges of the recesses into which the ball detent normally fits will rapidly wear away from the repeated engaging and disengaging of the ball detent with the net result that the predetermined torque at which the clutch is supposed to release will be substantially varied and will become inaccurate. Our invention is designed to overcome these disadvantages.

It is a general object of our invention to provide a novel and improved torque clutch of simple and inexpensive construction, operation, and maintenance.

A more specific object is to provide a novel and improved torque clutch which is simple and inexpensive in construction, operation, and maintenance and will operate in substantially friction-free relation upon release from driving position.

Another object is to provide a novel and improved torque clutch of simple and inexpensive construction which will automatically reset itself after having released itself from driving relation and upon the removal of the excessive torque and non-rotation of the driving member.

Another object is to provide a novel and improved torque clutch of simple construction which will automatically reset itself in synchronized driving relation with the driven member after having released itself from driving relation and upon the removal of the excessive torque and non-rotation of the driving member.

Another object is to provide a novel and improved rotary torque clutch of simple and inexpensive construction which will release itself from driving relation upon the application of excessive torque thereupon by the driven member and will thereafter remain in substantially friction-free non-driving relation until the excessive torque is removed and the driving member substantially ceases to rotate.

Another object is to provide a novel and improved rotary torque clutch utilizing a resiliently maintained driving connection between the rotary driving member and the rotary driven member and constructed and arranged to substantially entirely nullify the resilient urging upon the connecting member which established the driving connection as soon as the latter moves to non-driving position and so long as the driving member rotates rapidly, and to re-establish the resilient urging upon such connecting member as the driving member ceases to rotate.

These and other objects and advantages of this invention will more fully appear from the following description, made in connection with the accompanying drawings, wherein like reference characters refer to the same or similar parts throughout the several views, and in which:

FIG. 1 is an exploded perspective view of our torque clutch;

FIG. 2 is a side elevational view of the same with parts broken away to better illustrate the construction thereof;

FIG. 3 is a vertical sectional view taken along line 3—3 of FIG. 2; and

FIG. 4 is a fragmentary sectional view taken approximately along line 4—4 of FIG. 2 and showing one end of a shiftable segment in elevation.

One embodiment of our invention is shown in FIGS. 1–4 and includes a driving member indicated generally as 5 and a driven member indicated generally as 6. The driving member 5, as shown, includes a flanged tubular member 7 and a washer 8 which together, when assembled in conjunction with the other elements as hereinafter described define a channel therebetween as best shown in FIG. 2. The tubular member 7 has a bore 9 extending therethrough and is provided with a keyway 10 adapted to fixedly secure the tubular member 7 to a driving shaft 11 of an electric motor (not shown) or a similar source of rotary power. The outwardly extending flange 12 of the tubular member 7 is provided with a pivot opening or journal 13 which extends therethrough.

The inner face of the flange 12 of the tubular member 7 is provided with an annular rib 14 which extends in a circumferential direction relative to the flange and is not continuous in the area adjacent the journal 13. This rib 14 forms an inner circumferentially extending channel or way 15. An axially extending peripheral flange 16 cooperates with the rib 14 to define a groove 17 therebetween. This peripheral flange 16 is also not continuous and in fact extends only substantially half way around the side of the flange opposite the journal 13.

Fixedly secured to a segment of the flange 12 at its inner face is a fixed arcuately shaped block or segment 18. This segment 18 is secured to the inner face of the flange 12 by a pair of pins 19 and 20 which are received in openings 21 and 22 formed in the side of the segment 18. These pins 19 and 20 are also received within openings (not shown) formed in the inner face of the flange 12 so that the segment 18 cannot rotate relative to the flange. An arcuately shaped laterally extending rib 23 fits within the way 15 to aid in holding the segment 18 in fixed relation. A recess such as the recess 24 is formed in each end of the fixed segment 18 for a purpose to be hereinafter defined. A second laterally extending arcuately shaped rib 25 is formed on the opposite side of the segment 18 relative to the rib 23.

The washer 8 as best shown in FIG. 1, is also provided with a keyway 26 and a key 27 which is utilized to key the washer 8 to the reduced end of the tubular member 7 as viewed at the right in FIG. 1. A pair of pins 28 and 29 are received within openings provided therefor in the washer 8 and within openings provided therefor within the side of the fixed segment 18 to fixedly secure the segment 18 to the washer 8, the rib 25 fitting within the annular way or groove 30 which is formed on the inner face of the washer. A pivot opening or journal 31 is also provided in the peripheral portions of the washer 8.

Pivotally mounted within the journals 13 and 31 is a toggle member indicated generally as 32. This toggle member 32 has a pair of journal pins 33 and 34 which extend laterally from opposite sides and are received within the journals 13 and 31, respectively. As best shown in FIG. 1 the toggle member has a longer lever arm 35 and a shorter lever arm 36, the latter of which extends outwardly beyond the flange 12 of the tubular member 7 and outwardly beyond the washer 8. This can also be seen in FIG. 2. The shorter lever arm 36 is the portion of the toggle member which performs the driving function by engaging the driven member 6. A reset pin 37 also extends laterally from the longer lever arm 35 of the toggle member.

Bearing against one side of the toggle element 32 is one end of an arcuately shaped segment or block 38. The end which bears against the toggle element is flat and extends radially relative to the curvature of the segment. The opposite end of the segment has a recess 39 formed therein which is adapted to receive one end of a short coiled spring 40. The opposite end of the spring 40 is received within the recess 24 of the fixed segment 18. The spring 40 is of such length that it constantly urges the segment 38 against the longer lever arm 35 of the toggle member 32. At one side of the segment 38 there is an arcuately shaped rib 41 which extends outwardly. At the opposite side there is a second and similar rib 42. The rib 42 rides within the annular groove or way 30 of the washer 8. The rib 41 rides within the channel 15 of the tubular element 7 so that the segment 38 is capable of only circumferential movement relative to the two rotary members 5 and 6.

At the opposite side of the toggle 32 there is a second circumferentially shiftable segment 43 which has a radially extending end face bearing against the toggle element and has a recess 44 formed in its opposite end. The recess 44 is adapted to receive one end of a coiled spring 45 therein while the opposite end of the spring is received within the recess of the fixed segment 15 in an identical manner to that in which the spring 40 is received at the opposite end. The segment 43 has an arcuately shaped rib 46 at one of its sides and a second and similarly shaped and arranged rib 47 at its opposite side. The rib 47 is received within the groove or way 30 and the rib 46 extends into the way 15 so that the segment 43 may shift circumferentially of the tubular member 7 but only in that direction. The spring 45 is of such length as to constantly urge the segment 43 against the longer lever arm 35 of the toggle 32.

A resilient annular split ring 48 which is round in cross-sectional configuration and is normally smaller in diameter than the circumference of the rib 14 is snapped into place around the rib 14 so as to fit snugly therearound and have its free end positioned laterally of the longer lever arm 35 of the toggle 32 but in position to engage the reset pin 37 when the toggle member 32 shifts to a substantially circumferentially extending position. Normally the spring 48 does not engage any portion of the toggle member 32 but when the toggle member shifts to disengaging position such that the shorter lever arm 36 does not extend outwardly beyond the washer 8 or the flange 12, one of the free ends of the spring 48 will bear against the reset pin 37 and gently urge the toggle member 32 toward radially extending position again. It will be noted that the spring 48 is provided with a slight deformation 49 which is adapted to fit into a slight detent (not shown) formed in the peripheral flange 16 in order to insure that the spring 48 will not move circumferentially.

The driven member 6, as shown, consists of a cup shaped member 50 which has an axially extending groove 51 formed in its inner surface and adapted to receive the shorter lever arm 36 of the toggle member 32 therein. As best shown in FIG. 2 the driven member 6 encircles the driving member 5 and is secured thereto by a snap ring 52 which bears against a second washer 53 and snaps into a groove 54 formed on the inner surface of the cup shaped member 50. A similar but smaller snap ring 55 also snaps into place on the outer end of the tubular member 7 as best shown in FIG. 2 to additionally lock the washer 8 to the tubular member 7.

The driven member 6 has a hub 56 at its end opposite the cup shaped element which is provided with a bore 57 adapted to receive a driven shaft 58 therein and to be second thereto by a key 59 held in place by a set screw 60.

When the unit hereinbefore described is assembled as shown in FIGS. 2 and 3 it will be readily seen that the two circumferentially shiftable segments 38 and 43 normally urge the toggle 32 to a radially extending position relative to the two co-axially assembled driving and driven members 5 and 6 respectively. Because of the length of longer lever arm 35 a substantial amount of torque is required to cause the shorter lever arm 36 to swing out of the groove 51 of the cup shaped member 50 to a non-driving position. It will be readily appreciated that the torque at which the clutch will release can be predetermined by varying the length of the lever arm 35, the length of the circumferentially shiftable segments 38 and 43, or by varying the length or strength of the springs 40 and 45. Similarly, the fixed segment 18 may be made longer or shorter to provide the desired effect. It is a relatively simple matter, however, as is well understood in the art, to correlate these aspects or features of the various elements so that the clutch will release at a predetermined torque exerted by the driven member 6.

When the predetermined torque has been exceeded, the shorter lever arm 36 will be caused to swing in the direction in which the torque is applied by the driven member 6 or, conversely, the longer lever arm 35 will swing in the direction in which the torque is applied by the driving member 5. When this occurs the toggle member 32 will force the circumferentially shiftable segments 38 and 43 outwardly relative to the toggle member. The toggle member will then assume a position such that the shiftable segments 38 and 43 will be working against one another and a pressure applied by each will be working against the pivot pins 33 and 34 of the toggle member, thereby substantially nullifying the entire urging of the shiftable segments 38 and 43. Because the urging of the segments 38 and 43 have been nullified, there is no tendency by the toggle member 32 to return to radially extending position relative to the members 5 and 6 except for the action of the spring 48 which is not sufficiently strong to return the toggle member 32 to radially extending position so long as the unit is rotating rapidly and hence the device can continue to rotate without any appreciable friction between the driving member 5 and the driven member 6. Because of this friction free arrangement, it is possible for such a unit to run for many hours without any damage thereto and without any appreciable wear upon the groove defining edges of the groove 51. As a result a torque clutch of this construction will maintain its accuracy throughout prolonged periods of usage and despite frequent disengagement caused by overloading. We have found that a clutch of this construction can run for many hours with the driving element 32 in non-driving position without any serious damage to the clutch and, of course, without any danger to the source of rotary power.

When the speed of the driving member 5 is reduced such that it approaches a stopped position, this clutch will automatically reset in synchronized position with the driven element 6 for when the toggle 32 shifts to non-driving position such that its ends are substantially aligned with the axis of pivot thereof and between the ends of the shiftable segments 38 and 43, the reset pin 37 will engage one of the free ends of the spring 48. This spring 48 is relatively weak as compared to the resilient urging applied to the shiftable segments 38 and 43 but it is sufficient that it will urge the toggle member 32 back toward radially extending position when the driving member ceases to rotate or approaches a substantially non-rotating position. Thus it will be readily seen that the only force tending to urge the shorter lever arm into engagement with the groove 51 of the driven member 6 when the toggle member is in non-driving position is the relatively light urging of the spring 48 against the reset pin 37. The extent of this urging is so slight that no damage will result to the groove defining portions of the groove 51 and yet it is sufficient such that when the driving member 5 ceases to rotate and the toggle element moves around to a position opposite the groove 51, the toggle element will be moved to radially extending position. Immediately upon returning to radially extending position, the relatively strong urging of the segments 38 and 43 will again come into play for they will snap into their original positions whereat the ends thereof abut against the longer lever arm 35 of the toggle member.

It will be noted that the shiftable segments 38 and 43 as well as the fixed segment 18 are positioned such that they do not bear against the inner surface of the cup shaped member 50 and they do not extend outwardly as far as the periphery of the washer 8 or the flange 12. Likewise it will be noted that because of the co-axial arrangement and the relative size of these members, the flange member 12 and the washer 8 do not bear against the interior surface of the cup shaped member 50. This arrangement provides for substantially friction-free rotation when the toggle member 32 has been moved to non-driving position whereat the opposed urging of the shiftable segments 38 and 43 are substantially completely nullified.

From the above it can be seen that we have provided a torque clutch which can be constructed to release at a predetermined torque and which, upon release, moves immediately into substantially friction-free condition such that the driving member may rotate freely relative to the driven member without any damage thereto and without damage to the source of driving power. A device such as this is highly desirable in that it avoids the source of electric power such as an electric motor from burning out as the result of heating and locking of the clutch and it also avoids serious damage to the portions of the driven member which are engaged by the inner connecting or driving element. Consequently a clutch constructed in accordance with our invention can disengage and the driving member can continue to rotate throughout a prolonged period (such as overnight) without any damage to either the clutch or the source of power and permitting simple and automatic resetting of the same by merely stopping the source of rotary power, removing the source of overload, and permitting the device to reset itself. It will be noted that when the device does reset it is automatically in synchronized relation. This is important in machines where one function of a large machine is timed relative to another.

It will be noted that the spring 48 is entirely separate from the resilient urging means or springs 40 and 45 which bear against the shiftable segments 38 and 43. It will also be noted that this spring 48 does not come into play until such time as the action of the springs 40 and 45 have been completely nullified.

It will also be noted that our torque clutch will operate accurately in either direction without adjustment thereof. In addition, it will automatically reset at the torque for which it was originally set regardless of the direction (clockwise or counter clockwise) in which the torque is applied. It will be readily appreciated that this torque clutch may be mounted in a large number of various arrangements such as in sprockets, gears, pulleys, propellers, etc.

It will, of course, be understood that various changes may be made in the form, details, arrangement and proportions of the parts without departing from the scope of this invention which consists of the matter shown and described herein and set forth in the appended claims.

What is claimed is:

1. A torque clutch comprising a rotary driving member, a rotary driven member concentrically arranged with said driving member, a torque transmitting element movably mounted upon one of said members and extending between and engaging each of said members normally in driving relation and being movable between driving and non-driving positions relative to said members, and resiliently urged means movably carried by said member upon which said element is mounted and being movable only circumferentially of said members and engaging said element and urging the same into driving relation between said members, said means being movable to permit said element to move to non-driving position when a predetermined torque toward non-driving position is exerted upon said element by said driven member.

2. The structure defined in claim 1 wherein said element is pivotally mounted on said driving member and has an interconnecting portion extending radially beyond said driving member and engaging the other member in driving relation and wherein said circumferentially movable means is disposed in radially inwardly spaced relation relative to said interconnecting portion when the latter is in driving position, and means carried by said driven member and cooperating with said interconnecting portion to effect said driving relation between said members.

3. The structure defined in claim 1 wherein said element is pivotally mounted on one of said members in spaced relation to its axis of rotation, and means carried by the other of said members and cooperating with said element to effect said driving relation between said members, the axis of pivot of said elements and said resiliently urged means being disposed equidistantly radially of the axis of rotation of said members so as to nullify the urging of said last mentioned means when said elements in non-driving position to enable said members and said element to rotate in friction-free relation when said element is in non-driving position.

4. The structure defined in claim 1 wherein said members are spaced radially from each other and said element is pivotally mounted upon one of said members and pivots to non-driving position whereat it extends substantially normal to a radius of the direction of movement of said means which passes through the point of engagement of said means with said element and thereby nullifies the urging of said means and enables said members and said elements to rotate in friction-free relation.

5. A torque clutch comprising a rotary driving member, a rotary driven member concentrically arranged with said driving member, a driving element extending between said members and normally interconnecting the two in driving relation and being movable between driving and non-driving positions, and resiliently urged means engaging said element and urging the same into interconnecting driving relation between said members, said means including a pair of pressure transmitting elements shiftable only circumferentially of said members and disposed at opposite sides of said driving element and each normally urging said element into driving position.

6. A torque clutch comprising a rotary driving member, a rotary driven member arranged concentrically with said driving member, a driving element pivotally mounted on one of said members and extending between said members and normally interconnecting the two in driving relation and being pivotable between driving and non-driving positions, and resiliently urged means engaging said element and urging the same into interconnecting driving relation between said members, said means permitting said element to pivot to non-driving position when a predetermined torque toward non-driving position is applied to said element by said driven member, said means including a shiftable pressure transmitting member carried by one of said concentrically arranged members and engaging said element and urging the same toward driving position, said pressure transmitting member being shiftable only in a direction circumferentially of its carrying member and along an arc passing through the axis of pivot of said driving element.

7. An automatically resetting torque clutch comprising a rotary driving member, a rotary driven member arranged concentrically with said driving member, a torque transmitting element pivotally carried by one of said members having an inwardly extending lever arm of a given mass and an outwardly extending lever arm of a lesser mass and normally extending between said members and forming a driving connection therebetween and being movable between a driving and non-driving position relative to one of said members, resilient means carried by said member which carries said element and engaging said element and having portions normally urging the same from opposite directions into driving relation between said members, said portions being yieldable and disposed at opposite sides of said element opposite its axis of pivot and movable away from said element in opposite circumferential directions relative to its carrying member to permit said element to move to a non-driving position whereat the urging of said means is essentially nullified when a predetermined torque is exerted upon said element by said driven member, and separate relatively weak resilient means engaging said torque transmitting element and urging the same toward driving position between said members when said element is in non-driving position to cause the driving connection between said members to be automatically restablished as soon as said driving member ceases to rotate after said element has been moved to non-driving position.

8. The structure defined in claim 7 wherein said relatively weak resilient means engages said element only when the latter is in non-driving position.

9. The structure defined in claim 7 wherein said element is elongated and has opposite ends and said first mentioned resilient means remains in engagement at all times with said element but has its urging nullified by said element moving to non-driving position at which position the urging of said means is against the ends of said element and along its length.

10. A torque clutch comprising a rotary driving member, a rotary driven member arranged concentrically with said driving member, a toggle element pivotally mounted on one of said members and normally engaging the other of said members in driving relation, a pair of resiliently urged toggle engaging elements disposed one each at opposite sides of said toggle and engaging the same opposite its axis of pivot, said toggle engaging elements being shiftably mounted for only truly circumferential movement relative to said rotary members in an arc passing through the axis of pivot of said toggle element and cooperatively urging said toggle element into driving relation between said members, said toggle element being pivotable out of driving position when the torque applied thereto by said driven member is sufficient to overcome the cooperative urging of said toggle engaging elements.

11. The structure defined in claim 10 wherein said toggle when pivoted out of driving position extends substantially normal to the radius of the circumferential movement of said toggle engaging elements which passes through the axis of pivot of said toggle and thereby nullifies the urging of said toggle engaging elements.

12. A torque clutch comprising a rotary driving member, a rotary driven member arranged concentrically with said driving member, a torque transmitting element pivotally carried by one of said members and extending between said members and normally interconnecting the two in driving relation and being movable between driving and non-driving positions, a way formed in said member carrying said element and extending circumferentially thereof, a block mounted on said way for shifting movement therealong in a circumferential direction relative to said members and engaging said element opposite its axis of pivot and normally holding said element in driving relation with said members, and spring means carried by said element carrying member and engaging said block and urging the same against said element toward driving position of the latter.

13. An automatically resetting torque clutch comprising a rotary driving member, a rotary driven member arranged coaxially with and in encircling relation to said driving member, a toggle member pivotally mounted at the circumferential portions of said driving member and having an inwardly extending relatively long lever arm and an outwardly extending relatively short lever arm, means carried by said driven member for cooperating with said toggle member to effect a driving relation between said driving and driven members, said shorter lever arm extending outwardly beyond said driving member and engaging said means in driving relation and causing said driven member to rotate with said driving member so long as a predetermined torque is not exerted upon said shorter arm by said driven member, a circumferentially arranged way formed on said driving member adjacent said toggle member, a pair of pressure applying segments mounted on said way and movable therealong only in a circumferential direction, said segments being disposed on opposite sides of said toggle member and normally bearing against opposite sides of said toggle member opposite its axis of pivot, resilient means carried by said driving member and normally constantly urging said segments in opposite directions against said toggle member and thereby holding said shorter lever into driving relation with said driven member, said toggle member being pivotable to a substantially non-engaging position relative to said driven member whereat said toggle member extends substantially parallel to the direction of urging of said segments against said toggle member and thereby substantially nullifies the urging of said segments, separate relatively weak resilient means carried by said driving member and engaging and urging said toggle member toward driving relation relative to said driven member when said toggle member is in said non-engaging position whereby said members may rotate one relative to the other in substantially friction-free relation when said toggle element is in non-driving position and said toggle member will be automatically reset when the rotation of said members is arrested.

14. An automatically resetting torque clutch comprising a rotary driving member, a rotary driven member arranged concentrically with said driving member, a pivoted torque transmitting element carried by one of said members and normally extending between said members and forming a driving connection therebetween and being movable between a driving and non-driving position relative to one of said members, resilient means engaging said element and normally urging the same into driving relation between said members, said means being yieldable and constructed and arranged relative to said element to permit said element to move to a non-driving position whereat the urging of said means is essentially nullified when a predetermined torque is exerted upon said element by said driven member, the mass of said torque transmitting element being distributed relative to its axis of pivot so as to cause said element to be urged out of driving relation by centrifugal force as said members rotate after said element has been moved to non-driving position by such predetermined torque, and separate resilient means engaging said torque transmitting element and urging the same toward driving position between said members when said element is in non-driving position.

References Cited in the file of this patent

UNITED STATES PATENTS

| | | |
|---|---|---|
| 1,669,225 | Bayles | May 8, 1928 |
| 1,920,017 | McClatchie | July 25, 1933 |
| 2,253,466 | Grohn | Aug. 19, 1941 |
| 2,601,799 | Garwood | July 1, 1952 |

FOREIGN PATENTS

| | | |
|---|---|---|
| 291,593 | Italy | Dec. 21, 1931 |
| 848,588 | Germany | Sept. 4, 1952 |